United States Patent [19]

Oosterling et al.

[11] 4,141,202
[45] Feb. 27, 1979

[54] MOWING IMPLEMENT

[75] Inventors: Pieter A. Oosterling; Hendricus C. van Staveren, both of Nieuw-Vennep, Netherlands

[73] Assignee: Multinorm, B.V., Nieuw-Vennep, Netherlands

[21] Appl. No.: 844,303

[22] Filed: Oct. 21, 1977

Related U.S. Application Data

[63] Continuation of Ser. No. 775,041, Mar. 7, 1977, abandoned, which is a continuation of Ser. No. 722,487, Sep. 13, 1976, abandoned, which is a continuation of Ser. No. 536,742, Dec. 27, 1974, abandoned.

[51] Int. Cl.² .......................................... A01D 55/18
[52] U.S. Cl. .............................................. 56/295
[58] Field of Search ............... 56/6, 295, 192, 255; 308/190, 191, 193, 194, 195; 74/665 GA, 714, 801, 341–346, 348, 363, 369–372, 377

[56] References Cited

U.S. PATENT DOCUMENTS

| | | | |
|---|---|---|---|
| 119,640 | 10/1871 | Polson | 56/295 |
| 604,413 | 5/1898 | Palm | 56/295 |
| 1,909,748 | 5/1933 | Bohn | 308/190 X |
| 2,655,813 | 10/1953 | Howell | 308/190 X |
| 2,765,669 | 10/1956 | Tangen | 74/421 R |
| 3,019,501 | 2/1962 | Kraus et al. | 24/213 R |
| 3,469,378 | 9/1969 | Heesters et al. | 56/295 X |

*Primary Examiner*—Russell R. Kinsey
*Attorney, Agent, or Firm*—John P. Snyder

[57] ABSTRACT

A mowing implement comprising a housing extending transversely of the direction of movement of the implement, a plurality of cutting members rotatably journalled on said housing and a driving gear train driving the cutting members and arranged in said housing and formed by a series of gears, each cutting member being rigidly secured with a driving gear of said series, while the driving gears are coupled with one another by means of coupling gears, is simplified, if at least one gear of said series is rotatably journalled with respect to the housing by means of a ring of rolling bearing elements, at least one roller path of said elements being shaped in the material of the gear or in the material of a hub which is integrally connected with the housing.

23 Claims, 8 Drawing Figures

MOWING IMPLEMENT

This is a continuation of application Ser. No. 775,041, filed Mar. 7, 1977 and now abandoned which was a continuation of Ser. No. 722,487 filed Sept. 13, 1976 and now abandoned which was a continuation of Ser. No. 536,742 filed Dec. 27, 1974 and also now abandoned.

The invention relates to a mowing implement comprising a housing extending transversely of the direction of movement of the implement, a plurality of cutting members rotatably journalled on said housing and a driving gear train driving the cutting members and arranged in said housing and formed by a series of gears, each cutting member being rigidly secured with a driving gear of said series, whilst the driving gears are coupled with one another by means of coupling gears.

Such a mowing implement is known. In this known mowing implement each gear is rotatably beared with respect to the housing by means of a conventional bearing consisting of a ring engaging a hub of the housing, a ring engaging the gear and of a wreath of rolling bearing elements, such as balls, rollers or needles, said wreath being arranged between said rings.

The invention has for its object to simplify the mowing implement of the kind set forth. To this end at least one gear of said series is rotatably journalled with respect to the housing by means of a ring of rolling bearing elements, at least one roller path of said elements being shaped in the material of the gear or in the material of a hub which is integrally connected with the housing.

In accordance with the invention one or each of the two rings of the conventional bearing may be omitted.

The invention will become apparent from the following description of preferred embodiments of a mowing implement in accordance with the invention.

In the drawings:

FIG. 1 is a plan view of a tractor with a mowing implement embodying the invention, FIG. 2 is a front view, partly broken away, of the mowing implement on an enlarged scale, FIG. 3 is a horizontal sectional view of the housing of the driving gear train of the mowing implement shown in FIG. 1, FIG. 4 is a sectional view taken on the line IV—IV in FIG. 3, FIG. 5 is a sectional view taken on the line V—V in FIG. 3, FIG. 6 is a sectional view illustrating a modified form of mounting for the coupling gears 11;

Figure 1:
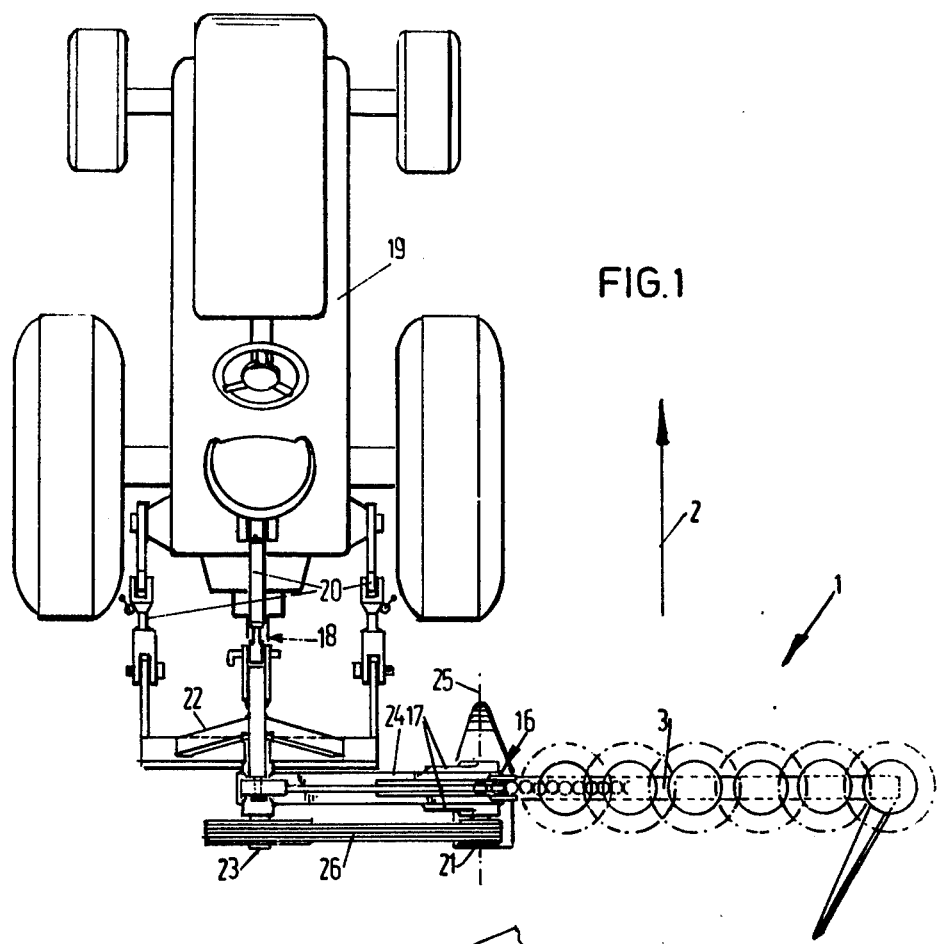
Figure 2:
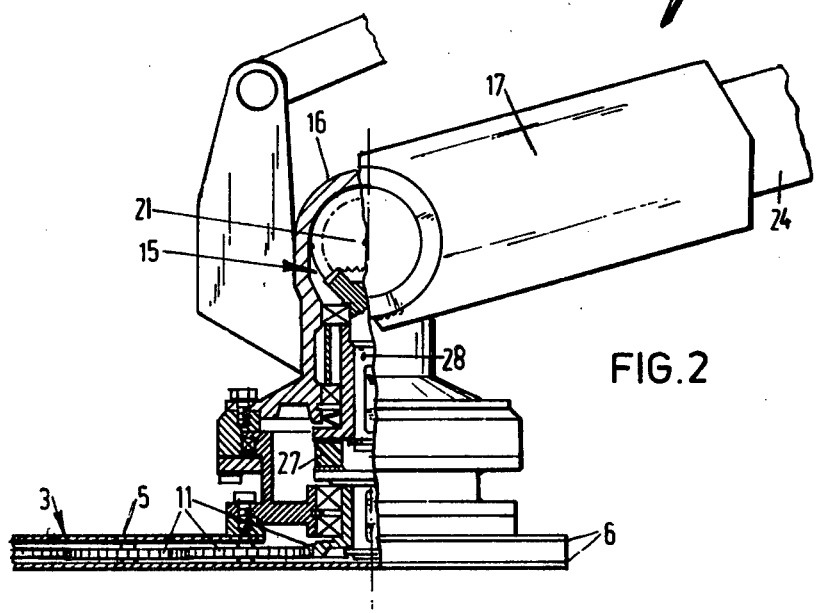
Figure 3:
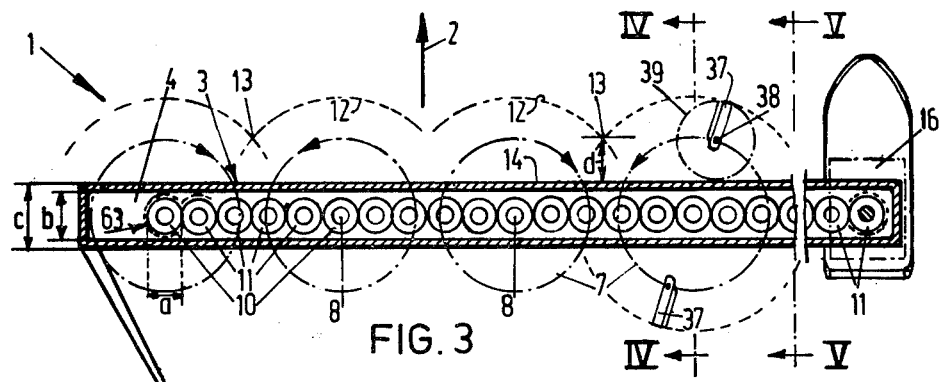

As shown in FIG. 1 the mowing implement 1 is connected with a frame 22 suspended to the lifting rods 20 of a tractor 19, in which frame 22 is journalled a driving shaft 23 driven by the power take-off shaft of the tractor 19, energized by the universal shaft 18. An auxiliary frame 24 is adapted to turn about the horizontal shaft 23 with respect to the frame 22. The auxiliary frame 24 is provided at its other end with two ears 17, arranged around a horizontal centre line 25 and coaxially to a housing 16 of a bevel gear drive 15. The input shaft 21 of this driving bevel gear 15 is also coaxial to the centre line 25. The shaft 21 is driven through a belt transmission 26 from the driving shaft 23.

The mowing implement 1 according to the invention comprises a housing 3, extending transversely of the intended direction of movement 2 and shaped in the form of a flat, elongated beam essentially formed by a channel-shaped bottom 4, to which a lid 5 is secured by welds 6. On the housing 3 a plurality of mowing members 7 are rotatably journalled on upright shafts 8. The cutting members 7 are arranged near and above the housing 3 and are adapted to rotate pairwise in opposite senses. Each cutting member 7 is rigidly secured by means of a shaft 8 to a driving gear 10 of a driving gear train 63 accommodated in the housing 3 and comprised of a series of gears i.e. said gears 10 and coupling gears 11. The coupling gear 11 nearest the tractor 19 is driven through an elastic coupling 27 and a shaft 28 by the bevel gear drive 15. An elastic coupling of this type, in a mowing machine environment, is shown in French Pat. No. 2031601.

Between each pair of gears 10 rotating in opposite senses towards one another four coupling gears 11 are arranged.

Each cutting member 7 comprises a disc 36, to which one or more, for example, two cutters 37 are fastened. The cutters 37 are positioned to move across adjacent discs 36 without touching the same (FIG. 1). The cutters 37 of adjacent mowing members 7 are relatively off-set through an angle of 90° so that they do not touch one another, although the paths of the cutters 37 overlap one another. Each cutter 37 is freely rotatable about a pin 38 and an upright axis 60.

Figure 4:
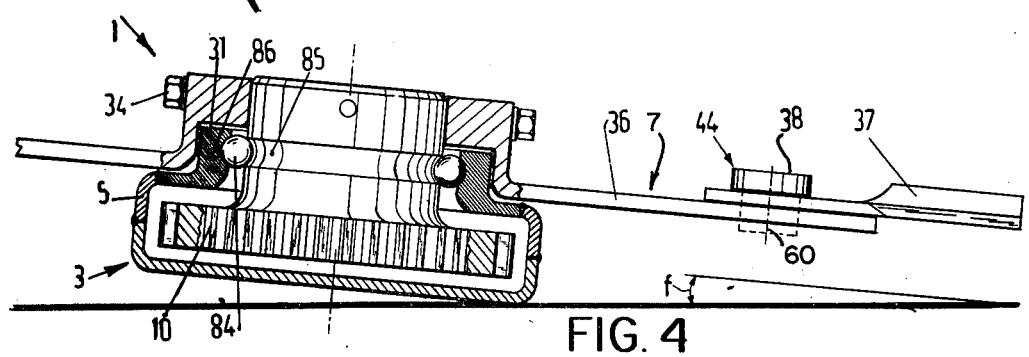

FIG. 4 shows the attachment of the disc 36 of each cutting member 7 by means of bolts 34 to a driving gear 10 being rotatably journalled with respect to the housing 3 by means of a wreath of rolling, ball-shaped bearing elements 84, an inner roller path 85 for said elements being formed in the material of the gear wheel 10 and an outer roller path 86 for said elements being formed in the material of a hub 31 welded to the lid 5 of the housing 3.

Figure 5:
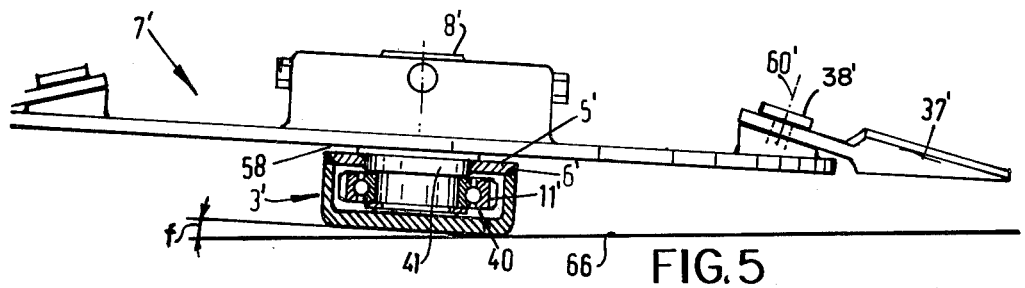

FIG. 5 shows the arrangement of the coupling gear 11' by means of a roll bearing 40 around a shaft 41 welded to the lid 5. The coupling gear 11' shown in FIG. 5 is formed by teeth cut in the outer ring of the roller, needle or ball bearing 40. Thus, if desired, gears 11' of even smaller diameters may be employed. The cutting member 7' is similar to that in FIG. 4 except that the pin 38' defines an inclined axis 60' for the cutter 37'. Otherwise, the components of FIG. 5 previously described in conjunction with FIGS. 1–4 are identified by primed corresponding reference characters.

Figure 6:
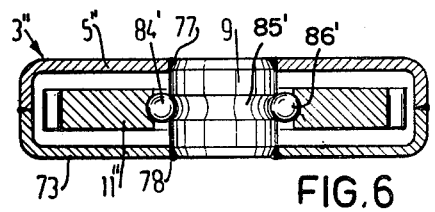

In the embodiment of FIG. 6 each coupling gear 11" is journalled with respect to the housing by means of a bearing in that a shaft 9 rigidly welded to the lid 5 and the bottom 73 at 77 and 78 forms a hub. An inner roller path 85' for the ball-shaped roller elements 84' is formed in the material of the shaft 9. An outer roller path 86' is formed in the material of the coupling gear 11. The shaft 9 may possibly be a hollow shaft.

Figure 7:
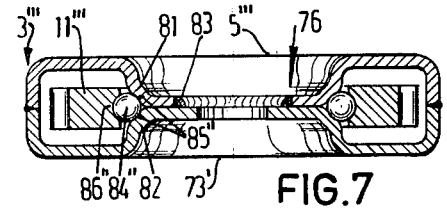
FIG. 7 is a view similar to FIG. 6 but showing another modification.

In the embodiment of FIG. 7 the bottom 73' and the lid 5''' of the housing ''' are provided with introverted parts 81 and 82 at the spot of the coupling gears 11''', said parts 81 and 82 being connected with one another by means of a welding seam 83. An inner roller path 85" for the bearing elements 84" is thus formed in the material of the hub 76 consisting of the two introverted parts 81 and 82.

Figure 8:
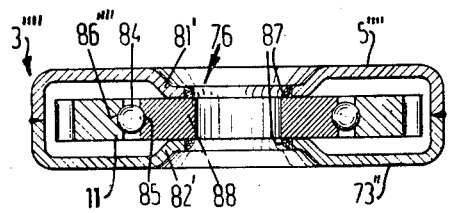
FIG. 8 is a view similar to FIG. 6 but showing still another modification.

In the embodiment of FIG. 8 the hub 76' is formed by the member 88 which is welded by means of a welding seam 87 between two introverted parts 81' and 82' dished inwardly from the top 5'''' and bottom 73'' of the housing 3'''', a roller path 85''' being formed in the material of said member 88 whereas the outer race 86''' for the bearing elements 84''' is formed in the gear 11''''.

What we claim is:

1. A mowing implement adapted to be transported in closely overlying relation to ground surface while cutting a swath of standing crop, comprising in combination:

an elongate housing having a selected narrow width so as easily to pass beneath the crop being cut;

a series of gears disposed within said housing in serially meshing arrangement, said series of gears comprising a plurality of driving gears disposed in uniformly spaced relation and a set of idler gears disposed between each adjacent pair of driving gears;

a shaft connected with each driving gear and projecting upwardly through said housing and rolling bearing means journalling each such shaft for rotation about an axis fixed with respect to said housing;

a member fixed to the upper end of each shaft and sweeping a circular path having a diameter much greater than said width of the housing, the spacing between said driving gears being such that said circular paths do not overlap, a cutter carried by each member and projecting therefrom such that each cutter sweeps a second circular path which overlaps the path swept by an adjacent cutter; and idler rolling bearing means journalling each idler gear for rotation about an axis fixed with respect to said housing, each idler gear forming the outer race of its associated idler bearing means.

2. A mowing implement according to claim 1 wherein each idler bearing means includes an inner race formed integrally with said housing.

3. A mowing implement according to claim 1 including an idler shaft for each idler gear, each idler shaft being permanently fixed to said housing and each idler bearing means including an inner race formed in an associated idler shaft.

4. A mowing implement as defined in claim 1 wherein each idler bearing means includes an inner race ring sandwiched between and permanently secured to opposing portions of said housing.

5. A mowing implement as defined in claim 4 wherein there are at least four idler gears in each set thereof.

6. A mowing implement adapted to be transported in closely overlying relation to ground surface while cutting a swath of standing crop, comprising in combination:

an elongate housing having a selected narrow width so as easily to pass beneath the crop being cut;

a series of gears disposed within said housing in serially meshing arrangement, said series of gears comprising a plurality of driving gears disposed in uniformly spaced relation and a set of idler gears disposed between each adjacent pair of driving gears;

a shaft connected with each driving gear and projecting upwardly through said housing and rolling bearing means journalling each such shaft for rotation about an axis fixed with respect to said housing;

a member fixed to the upper end of each shaft and sweeping a circular path having a diameter greater than said width of the housing, a cutter carried by each member and projecting therefrom such that each cutter sweeps a second circular path which overlaps the path swept by an adjacent cutter; and idler rolling bearing means journalling each idler gear for rotation about an axis fixed with respect to said housing, each idler gear forming the outer race of its associated idler bearing means.

7. A mowing implement adapted to be transported in closely overlying relation to ground surface while cutting a swath of standing crop, comprising in combination:

an elongate housing having a selected narrow width so as easily to pass beneath the crop being cut;

a series of gears disposed within said housing in serially meshing arrangement, said series of gears comprising a plurality of driving gears disposed in uniformly spaced relation and a set of idler gears disposed between each adjacent pair of driving gears;

a shaft connected with each driving gear and projecting upwardly through said housing and rolling bearing means journalling each such shaft for rotation about an axis fixed with respect to said housing;

a member fixed to the upper end of each shaft and sweeping a circular path having a diameter greater than said width of the housing, a cutter carried by each member and projecting therefrom such that each cutter sweeps a second circular path which overlaps the path swept by an adjacent cutter; and idler rolling bearing means journalling each idler gear for rotation about an axis fixed with respect to said housing, each idler bearing means including an inner race formed integrally with said housing.

8. A mowing implement adapted to be transported in closely overlying relation to ground surface while cutting a swath of standing crop, comprising in combination:

an elongate housing having a selected narrow width so as easily to pass beneath the crop being cut;

a series of gears disposed within said housing in serially meshing arrangement, said series of gears comprising a plurality of driving gears disposed in uniformly spaced relation and a set of idler gears disposed between each adjacent pair of driving gears;

a shaft connected with each driving gear and projecting upwardly through said housing and rolling bearing means journalling each such shaft for rotation about an axis fixed with respect to said housing;

a member fixed to the upper end of each shaft and sweeping a circular path having a diameter greater than said width of the housing, a cutter carried by each member and projecting therefrom such that each cutter sweeps a second circular path which overlaps the path swept by an adjacent cutter; and idler rolling bearing means journalling each idler gear for rotation about an axis fixed with respect to said housing, an idler shaft for each idler gear, each idler shaft being permanently fixed to said housing and each idler bearing means including an inner race formed in an associated idler shaft.

9. A mowing implement adapted to be transported in closely overlying relation to ground surface while cutting a swath of standing crop, comprising in combination:

an elongate housing having a selected narrow width so as easily to pass beneath the crop being cut;

a series of gears disposed within said housing in serially meshing arrangement, said series of gears comprising a plurality of driving gears disposed in uniformly spaced relation and a set of idler gears disposed between each adjacent pair of driving gears;

a shaft connected with each driving gear and projecting upwardly through said housing and rolling bearing means journalling each such shaft for rotation about an axis fixed with respect to said housing;

a member fixed to the upper end of each shaft and sweeping a circular path having a diameter greater than said width of the housing, a cutter carried by each member and projecting therefrom such that each cutter sweeps a second circular path which overlaps the path swept by an adjacent cutter; and idler rolling bearing means journalling each idler gear for rotation about an axis fixed with respect to said housing, each idler bearing means including an inner race ring sandwiched between and permanently secured to opposing portions of said housing.

10. A mowing implement as defined in claim 8 wherein there are at least four idler gears in each set thereof.

11. A mowing implement as defined in claim 7 wherein there are at least four idler gears in each set thereof.

12. A mowing implement as defined in claim 1 wherein there are at least four idler gears in each set thereof.

13. A mowing implement as defined in claim 8 wherein there are at least four idler gears in each set thereof.

14. A mowing implement adapted to be transported in closely overlying relation to ground surface while cutting a swath of standing crop, comprising in combination:

a straight line series of gears disposed within said housing in serially meshing arrangement, said series of gears comprising a plurality of driving gears disposed in uniformly spaced relation and a set of an even number of idler gears disposed between each adjacent pair of driving gears, there being at least four idler gears in each set;

said housing having an opening on its upper side at each location of a driving gear;

a shaft connected with each driving gear and projecting upwardly therefrom to present an upper end concentric with an associated opening in said housing and bearing means rotatably journalling each such shaft for rotation about an axis fixed with respect to said housing and concentric with respect to said associated opening whereby to provide said uniformly spaced relation between said driving gears, said housing comprising upper and lower sections which are permanently joined and including first portions fixed to said housing at said openings which are aligned in a straight line with each other and which fix said axes with respect to the housing, said idler gears being identical to each other and having a diameter such that each set thereof spans between adjacent driving gears with all of said idler gears of the set being in mesh and with the opposite end idler gears of the set being in mesh with such adjacent driving gears;

a member fixed to the upper end of each shaft and sweeping a circular path having a diameter greater than said width of the housing, a cutter carried by each member and projecting therefrom such that each cutter sweeps a second circular path which overlaps the path swept by an adjacent cutter; and support means connecting each idler gear to said housing for rotation about an axis fixed with respect to the housing, each support means comprising idler rolling bearing means and including a second portion fixed to said housing, said second fixed portions being in straight line alignment with each other and with said first fixed portions whereby said housing and fixed portions as an integral unit establishes and maintains both the straight line alignment and spacing of all of said axes.

15. A mowing implement as defined in claim 14 wherein each second fixed portion defines the inner race of an idler rolling bearing means.

16. A mowing implement as defined in claim 15 wherein each idler gear forms the outer race of an idler rolling bearing means.

17. A mowing implement as defined in claim 16 wherein each inner race is defined by inwardly deformed portions of the upper and lower sections of the housing.

18. A mowing implement as defined in claim 16 wherein each inner race is formed by a ring sandwiched between and permanently secured to the upper and lower sections of said housing.

19. A mowing implement as defined in claim 17 wherein each inner race is formed by an idler shaft permanently fixed to said housing.

20. A mowing implement as defined in claim 15 wherein each inner race is defined by inwardly deformed portions of the upper and lower sections of the housing.

21. A mowing implement as defined in claim 15 wherein each inner face is formed by a ring sandwiched between and permanently secured to the upper and lower sections of said housing.

22. A mowing implement as defined in claim 15 wherein each inner race is formed by an idler shaft permanently fixed to said housing.

23. A mowing implement as defined in claim 15 wherein said first and second fixed portions are integral with said housing sections.

* * * * *

UNITED STATES PATENT AND TRADEMARK OFFICE
CERTIFICATE OF CORRECTION

PATENT NO. : 4,141,202

DATED : February 27, 1979

INVENTOR(S) : Pieter A. Oosterling, et al

It is certified that error appears in the above-identified patent and that said Letters Patent are hereby corrected as shown below:

Kindly insert the priority data as follows:

--[30] Foreign Application Priority data

Netherlands 73.17823 of December 28, 1973--

Signed and Sealed this

Eighth Day of May 1979

[SEAL]

Attest:

RUTH C. MASON
Attesting Officer

DONALD W. BANNER
Commissioner of Patents and Trademarks